(12) United States Patent
Helmers

(10) Patent No.: US 8,863,492 B2
(45) Date of Patent: Oct. 21, 2014

(54) COMBINED CYCLE POWER PLANT WITH SPLIT COMPRESSOR

(75) Inventor: Lennard Helmers, Mülheim a.d. Ruhr (DE)

(73) Assignee: Siemens Energy, Inc., Orlando, FL (US)

( * ) Notice: Subject to any disclaimer, the term of this patent is extended or adjusted under 35 U.S.C. 154(b) by 953 days.

(21) Appl. No.: 13/005,628

(22) Filed: Jan. 13, 2011

(65) Prior Publication Data

US 2011/0173989 A1 Jul. 21, 2011

Related U.S. Application Data

(60) Provisional application No. 61/296,232, filed on Jan. 19, 2010.

(51) Int. Cl.
*F02C 6/00* (2006.01)
*F02G 1/00* (2006.01)
*F01K 13/00* (2006.01)
*F22B 1/18* (2006.01)
*F01K 23/10* (2006.01)

(52) U.S. Cl.
CPC ............. *F01K 13/00* (2013.01); *Y02E 20/14* (2013.01); *Y02E 20/16* (2013.01); *F22B 1/1815* (2013.01); *F01K 23/10* (2013.01)
USPC ......................... 60/39.182; 60/39.15; 60/39.5

(58) Field of Classification Search
CPC .......... F01K 23/10; F02C 6/18; F22B 1/1815; Y02E 20/16; Y02E 20/18; Y02E 20/185
USPC ................ 60/39.182, 39.5, 39.52, 39.15, 670
See application file for complete search history.

(56) References Cited

U.S. PATENT DOCUMENTS

| 3,325,992 A | * | 6/1967 | Sheldon ..................... 60/39.182 |
| 4,261,167 A | * | 4/1981 | Paull et al. ...................... 60/781 |
| 4,271,665 A | * | 6/1981 | Mandrin .................... 60/39.182 |
| 4,321,790 A | | 3/1982 | Vades et al. |
| 4,720,968 A | | 1/1988 | Knizia |
| 4,785,621 A | | 11/1988 | Alderson et al. |
| 5,212,942 A | | 5/1993 | Malohn |
| 5,595,059 A | | 1/1997 | Huber et al. |
| 5,660,037 A | | 8/1997 | Termuehlen |
| 6,038,849 A | | 3/2000 | Nakhamkin et al. |
| 6,089,024 A | | 7/2000 | Hatanaka |

(Continued)

FOREIGN PATENT DOCUMENTS

| DE | 10335143 A1 | 2/2005 |
| FR | 2424412 | 11/1979 |
| GB | 2143589 A | 2/1985 |

*Primary Examiner* — William H Rodriguez

(57) ABSTRACT

A combined cycle power plant including a gas turbine engine having a first compressor providing compressed air for combustion to form a hot working gas, and a turbine section for expanding the hot working gas. A first heat recovery steam generator (HRSG) is provided for receiving an exhaust gas flow from the turbine section to form a reduced temperature exhaust gas and to produce a high pressure steam flow which is provided to a high pressure steam turbine. A second compressor is provided for receiving and compressing the reduced temperature exhaust gas to add energy and form a reheated exhaust gas. A second heat recovery steam generator (HRSG) is provided for receiving and removing heat from the reheated exhaust gas to produce a low pressure steam flow, and a low pressure steam turbine is provided for receiving and expanding the low pressure steam flow.

17 Claims, 3 Drawing Sheets

(56) References Cited

U.S. PATENT DOCUMENTS

| | | | |
|---|---|---|---|
| 6,449,954 B2 * | 9/2002 | Bachmann | 60/775 |
| 6,499,303 B1 | 12/2002 | Polukort et al. | |
| 6,543,234 B2 | 4/2003 | Anand et al. | |
| 6,647,728 B2 | 11/2003 | Seitz | |
| 7,584,599 B2 | 9/2009 | Benz et al. | |
| 7,634,915 B2 * | 12/2009 | Hoffmann et al. | 60/780 |
| 7,640,643 B2 | 1/2010 | Nakhamkin | |
| 7,739,875 B2 | 6/2010 | Bartlett | |
| 7,770,376 B1 | 8/2010 | Brostmeyer | |
| 8,327,647 B2 * | 12/2012 | Guidati et al. | 60/772 |
| 2008/0010967 A1 * | 1/2008 | Griffin et al. | 60/39.182 |
| 2009/0235671 A1 * | 9/2009 | Rabovitser et al. | 60/806 |
| 2009/0252659 A1 | 10/2009 | Iijima et al. | |
| 2009/0301054 A1 | 12/2009 | Simpson et al. | |

* cited by examiner

COMBINED CYCLE POWER PLANT WITH SPLIT COMPRESSOR

CROSS-REFERENCE TO RELATED APPLICATIONS

This application claims the benefit of U.S. Provisional Application No. 61/296,232, filed Jan. 19, 2010, which is incorporated herein by reference.

FIELD OF THE INVENTION

The present invention relates generally to gas turbine power plants and, more particularly, to combined cycle power plants.

BACKGROUND OF THE INVENTION

Power generation plants for producing electric power often comprise combined cycle power plants to meet the needs of efficient and flexible power production. Combined cycle power plants typically combine a steam turbine system with a gas turbine engine connected to generator. In particular, the waste heat from the gas turbine engine may be used to generate steam, such as in a heat recovery steam generator (HRSG), and the steam may be supplied to the steam turbine for generation of additional electrical energy. Hence, otherwise unused energy in the form of waste heat from the gas turbine engine may be converted into an additional energy output through the steam turbine system.

Various approaches have been proposed to further increase the efficiency and/or work output of combined cycle power plants. For example, with regard to the efficiency of the gas turbine engine, the overall efficiency of the gas turbine engine may vary as a function of the compressor and turbine efficiencies, ambient air temperature, turbine inlet temperature and the overall pressure ratio. Efficiencies in the engine may be increased by operating the compressor at lower gas temperatures, operating the turbine at higher gas temperatures, and operating at a higher overall pressure ratio. With regard to the steam turbine system, additional efficiencies may be obtained by improving the conversion of thermal energy from the gas turbine engine exhaust to usable energy in the form of steam in the HRSG.

SUMMARY OF THE INVENTION

In accordance with an aspect of the invention, a method of increasing an efficiency of operation of a combined cycle power plant is provided. The method comprises providing a gas turbine engine providing a first power output and producing a turbine exhaust gas flow. Heat is removed from the turbine exhaust gas flow in a first heat recovery steam generator (HRSG) to form a reduced temperature exhaust gas and to produce a high pressure steam flow. The high pressure steam flow is expanded in a high pressure steam turbine to produce a second power output. The reduced temperature exhaust gas is compressed to add energy and form a reheated exhaust gas. Heat is removed from the reheated exhaust gas in a second heat recovery steam generator (HRSG) to produce a low pressure steam flow, and the low pressure steam flow is expanded in a low pressure steam turbine to increase the second power output.

In accordance with further aspects of the invention, the turbine exhaust gas flow may pass through the second HRSG to remove heat subsequent to removing heat from the turbine exhaust gas flow in the first HRSG and prior to compression of the exhaust gas. The low pressure steam flow may be produced by heat from both the reheated exhaust gas and the turbine exhaust gas flow passing from the first HRSG. Power may be supplied to a compressor from the low pressure steam turbine to compress the reduced temperature exhaust gas and form the reheated exhaust gas. A compressor provided to compress the reduced temperature exhaust gas and form the reheated exhaust gas may operate at a speed unrelated to a speed of the gas turbine engine. A second low pressure steam turbine may be provided for expanding low pressure steam from the second HRSG, and power may be supplied to a compressor from the second low pressure steam turbine to compress the reduced temperature exhaust gas and form the reheated exhaust gas. The first power output may comprise a power output to a first generator and the second power output may comprise a power output to a second generator.

In accordance with another aspect of the invention, a combined cycle power plant may be provided comprising a gas turbine engine including a first compressor providing compressed air for combustion to form a hot working gas, and a turbine section for expanding the hot working gas and producing a turbine exhaust gas flow. A first heat recovery steam generator (HRSG) is provided for receiving the turbine exhaust gas flow and for removing heat from the turbine exhaust gas flow to form a reduced temperature exhaust gas and to produce a high pressure steam flow. A high pressure steam turbine is provided for receiving and expanding the high pressure steam flow. A second compressor is provided for receiving and compressing the reduced temperature exhaust gas to add energy and form a reheated exhaust gas. A second heat recovery steam generator (HRSG) is provided for receiving and removing heat from the reheated exhaust gas to produce a low pressure steam flow, and a low pressure steam turbine is provided for receiving and expanding the low pressure steam flow.

In accordance with further aspects of the invention, the combined cycle power plant may include a connection providing power from the low pressure turbine to the second compressor. A connection may be provided combining an output power from the lower pressure steam turbine with an output power of the high pressure steam turbine. A generator may be provided driven by the combined output power of the high pressure steam turbine and the low pressure steam turbine. The low pressure steam turbine may comprise an auxiliary low pressure steam turbine, and the power plant may include a power generation low pressure steam turbine connected to the high pressure steam turbine. A generator may be provided driven by the combined output power of the high pressure steam turbine and the power generation low pressure steam turbine. An exhaust gas flow outlet of the first HRSG may be connected to an exhaust gas flow inlet of the second HRSG, and an exhaust gas flow outlet of the second HRSG may be connected to the second compressor and provide the reduced temperature exhaust gas to the second compressor. The first HRSG and second HRSG may comprise different sections of a combined HRSG unit. A connection may be provided combining an output power from the low pressure steam turbine with an output power of the high pressure steam turbine. An intermediate pressure steam turbine may be provided and a connection combining an output power from the intermediate pressure steam turbine with the output power of the high pressure steam turbine. A first generator may be powered by the gas turbine engine and a second generator may be powered by the high pressure steam turbine, and the first and second generators may comprise different sections of a combined generator unit.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
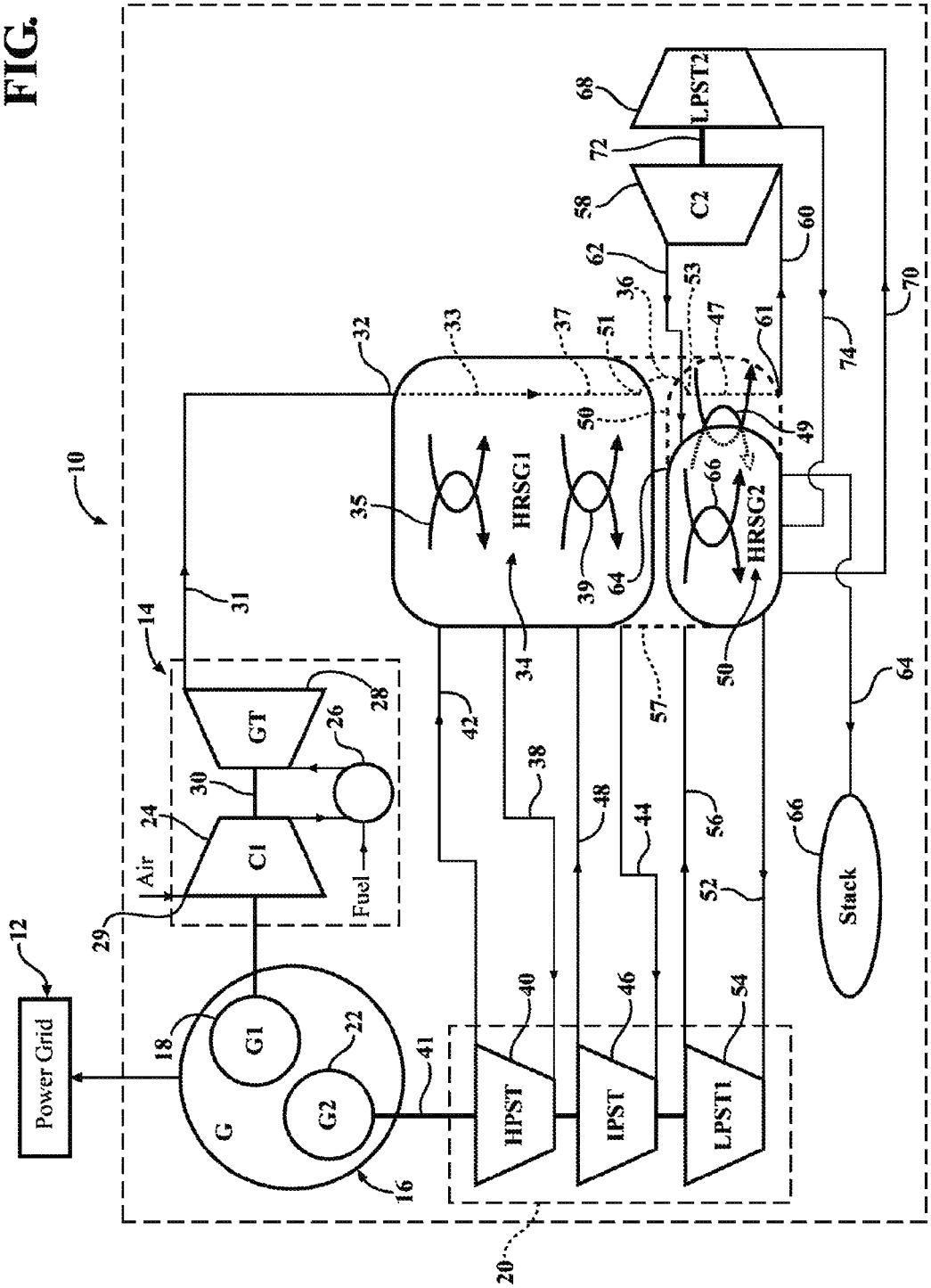
FIG. 1 is a diagrammatic illustration of a power plant incorporating components of an embodiment of the present invention.

Referring to FIG. 1, there is shown a diagrammatic illustration of a combined cycle power plant 10 in accordance with an embodiment of the present invention, such as a power plant for supplying power to a power grid 12. The combined cycle power plant 10 includes a gas turbine engine 14 operating in accordance with a Brayton cycle and providing an output power to a first generator 18 of a generator unit 16, and a steam turbine unit 20 operating in accordance with a Rankine cycle and providing an output power to a second generator 22 of the generator unit 16. Power output from the power plant 10 is depicted as being output from the generator unit 16 to the power grid 12. It should be understood that the generator unit 16 may represent a single generator for the power plant 10 receiving power outputs from both the gas turbine engine 14 and the steam turbine unit 20, in which case the generators 18, 20 in FIG. 1 may represent respective first and second sections of a combined generator unit 16 for receiving the output power of the gas turbine engine 14 and the steam turbine unit 20. That is, in a configuration where the generator unit 16 comprises a single generator for the power plant 10, the first and second sections, as represented by 18 and 22, may comprise transmission elements, e.g., a clutch, that may facilitate transmission of the power from the gas turbine engine 14 and the steam turbine unit 20 into the generator unit 16.

The gas turbine engine 14 generally includes a compressor section 24, a combustor 26 and a turbine section 28. Air enters an inlet 29 to the compressor section 24 and is compressed to a higher pressure as it travels through the compressor section 24. After traveling through the compressor section 24, the air enters the combustor 26 where fuel is supplied, and the air and fuel are mixed and ignited in the combustor 26 to form a hot working gas comprising combustion products of the burned air/fuel mixture. The hot working gas is expanded in the turbine section 28, and the energy of the hot working gas is converted into work to drive a rotor shaft 30 for driving the compressor section 24. In addition, the rotor shaft 30 provides the power output to the first generator 18.

An exhaust gas flow 31 from the turbine section 28 comprises an expanded hot working gas or exhaust gas 32 at a high temperature. For example, the exhaust gas 32 exiting the turbine section 28 may be at a temperature in a range from about 1020° F. to about 1200° F. (about 550° C. to about 650° C.). The high temperature exhaust gas 32 is directed to a first heat recovery steam generator (HRSG) 34, providing energy to the first HRSG 34. Specifically, the exhaust gas flow 31 exits the turbine section 28 at a high temperature and passes through the first HRSG 34. Heat is removed from the exhaust gas 32 along a first heat exchange portion 33 of the exhaust gas flow 31 in a first heat exchange region 35 of the first HRSG 34, lowering the temperature of the high temperature exhaust gas 32 to form a reduced temperature exhaust gas 36 exiting a flow outlet 51 of the first HRSG 34. The energy removed from the exhaust gas 32 converts water to steam in the first HRSG 34, and the steam may be provided as high-temperature/high-pressure steam flow 38, i.e., superheated steam flow, to a high-pressure steam turbine 40 of the steam turbine unit 20. The high-temperature/high-pressure steam may be expanded in the high-pressure steam turbine 40 to produce a work output through a rotor shaft 41 of the steam turbine unit 20 for powering the second generator 22, and the expanded steam exhaust may be returned as a steam exhaust flow 42 to the first HRSG 34.

Optionally, the first HRSG 34 may produce an intermediate-temperature/intermediate-pressure steam flow 44 that may be supplied to an intermediate-pressure steam turbine 46. That is, the exhaust gas flow 31 may include a second heat exchange portion 37, downstream from the first heat exchange portion 33, in a second heat exchange region 39 of the first HRSG 34, where energy is removed from the exhaust gas 32 to convert water to steam and further reduce the temperature of the exhaust gas 32. The intermediate-temperature/intermediate-pressure steam may be expanded in the intermediate-pressure steam turbine 46 to produce an additional work output on the rotor shaft 41 of the steam turbine unit 20 for powering the second generator 22, and the expanded steam exhaust may be returned from the intermediate-pressure steam turbine 46 as a steam exhaust flow 48 to the first HRSG 34.

The reduced temperature exhaust gas 36 may be directed to a flow inlet 53 of a second heat recovery steam generator (HRSG) 50, providing energy to the second HRSG 50. Specifically, the exhaust gas flow 31 exits the first HRSG 34 and may include a third heat exchange portion 47 passing through a first heat exchange region 49 of the second HRSG 50 where heat is removed from the reduced temperature exhaust gas 36, further lowering the temperature of the reduced temperature exhaust gas 36. The energy removed from the reduced temperature exhaust gas 36 converts water to low-temperature/low-pressure steam in the second HRSG 50, which may be provided as a low temperature/low-pressure steam flow 52 to a power generation low-pressure steam turbine 54 of the steam turbine unit 20. The low-temperature/low-pressure steam may be expanded in the low-pressure steam turbine 54 to produce an additional work output through the rotor shaft 41 of the steam turbine unit 20, and the expanded steam exhaust from the low-pressure steam turbine 54 may be returned to the second HRSG 50 as a steam exhaust flow 56.

It should be understood that the first HRSG 34 and second HRSG 50 may be combined in a single HRSG unit 57, as illustrated herein, or may be provided as physically separate units.

The efficiency of the gas turbine engine portion of the combined cycle power plant 10 is related to the difference between the work input provided to the compressor section 24 from the turbine section 28 and the work output from the gas turbine engine 14, i.e., the net work output to the generator unit 16, at the expense of power input by fuel through the combustor 26. In a typical gas turbine engine compressor, work is performed on the air as it passes through successive stages of the compressor with a corresponding increase in energy.

Both the gas turbine expansion and compression processes increase their power production/consumption at increasing pressure ratios and inlet temperatures. In particular, the compression process can be viewed as a sequence of two compression processes. The overall power consumption can, in this case, be described with two partial pressure ratios and respective inlet temperatures.

In accordance with an aspect of the present invention, the two compression inlet temperatures are physically decoupled. A reduction of the inlet temperature to the second compression process as compared to the sequential process of a gas turbine operating at the same expansion pressure ratio offers a potential for a reduction of the overall work input to the compression process.

In accordance with an aspect of the present invention, a reduction of the inlet air temperature for different portions of the compression process may be provided, to provide a decrease in the overall work required to obtain a predetermined or desired pressure ratio for the gas turbine engine cycle. In particular, the compression process may comprise a split compression process for the gas stream flowing through the gas turbine engine cycle, where the total compression process for the cycle may comprise compression provided by the compressor section 24 (a first compressor) and compression provided by a second compressor 58 downstream from the turbine section 28 that receives a reduced temperature exhaust gas flow 60 exiting an exhaust flow outlet 61 of the second HRSG 50. The compressor section 24 provides a first compressor pressure ratio upstream of the turbine section 28, and the second compressor 58 provides a second compressor pressure ratio for compressing, i.e., inputting work energy, into the reduced temperature exhaust gas flow 60.

The reduced temperature exhaust gas flow 60 received at the second compressor 58 is at a lower temperature than the reduced temperature exhaust gas 36 exiting the first HRSG 34, and further may be at a lower temperature than the temperature of the compressed air exiting the compressor section 24. The temperature of the reduced temperature exhaust gas flow 60 is increased in the second compressor 58 to form a reheated exhaust gas flow 62 which is supplied to an inlet 64 to the second HRSG 50. The reheated exhaust gas flow 62 passes through a second heat exchange region 66 where the reheated exhaust gas flow 62 may provide further heat for the production of low-temperature/low-pressure steam forming the low-temperature/low-pressure steam flow 52 for the low pressure turbine 54. Subsequent to passing through the second heat exchange region 66 of the second HRSG 50, the reheated exhaust gas flow 62 may exit the second HRSG 50 as a stack gas flow 64 to a stack 66 for the combined cycle power plant 10.

Power for the second compressor 58 may be provided by a second or auxiliary low-pressure steam turbine 68 operating independently of the steam turbine unit 20. A low-temperature/low-pressure steam flow 70 from the second HRSG 50 may be expanded in the auxiliary low-pressure steam turbine 68 to provide the power to the second compressor 58 via a rotor shaft 72. The expanded steam is returned to the second HRSG 50 as an expanded steam flow 74. Operation of the auxiliary low-pressure steam turbine 68 separately from the steam turbine unit 20 permits the second compressor 58 to be operated at a speed independent from speed restrictions that may apply to the steam turbine unit 20 and associated generator 22 for meeting the frequency requirements of the power grid 12.

Figure 2:
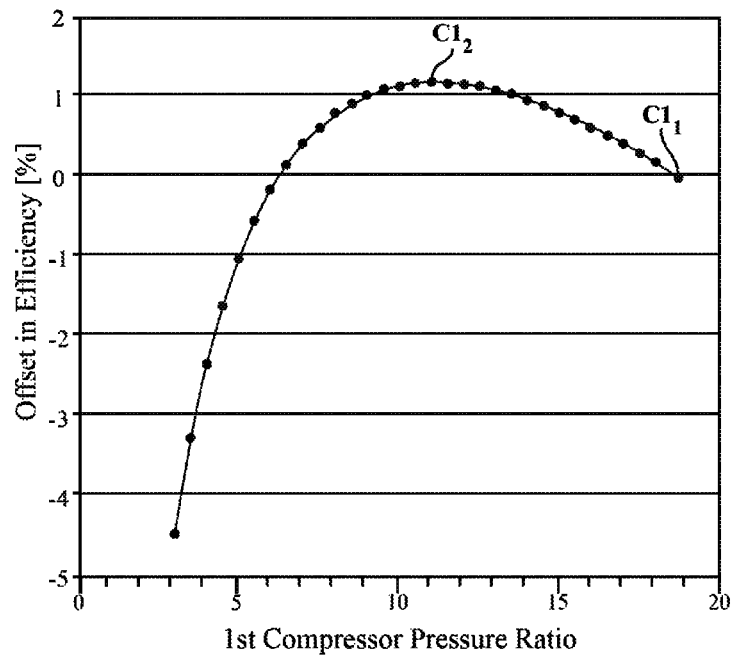
FIG. 2 is graph illustrating a change in efficiency with a change in the pressure ratio of a compressor section of a gas turbine engine in accordance with an aspect of the present invention.

As discussed above, the compression process may be split between the compressor section 24 and the second compressor 58. The pressure ratio provided by the compressor section 24 may be reduced from that typically provided in a compressor upstream from an expansion gas turbine. For example, as is illustrated in FIG. 2, a compressor in a gas turbine engine may typically operate at a baseline pressure ratio of about 19, indicated by point $C1_1$. In accordance with an aspect of the present invention, it may be possible to improve the efficiency of operation of the gas turbine engine 14 and the combined cycle power plant 10 by operating the compressor section 24 at a reduced pressure ratio, such as at a pressure ratio of between about 19 (point $C1_1$) and about 11 (point $C1_2$), to provide an improvement in operational efficiency of the combined cycle power plant 10 of up to about 1.1%.

Figure 3:
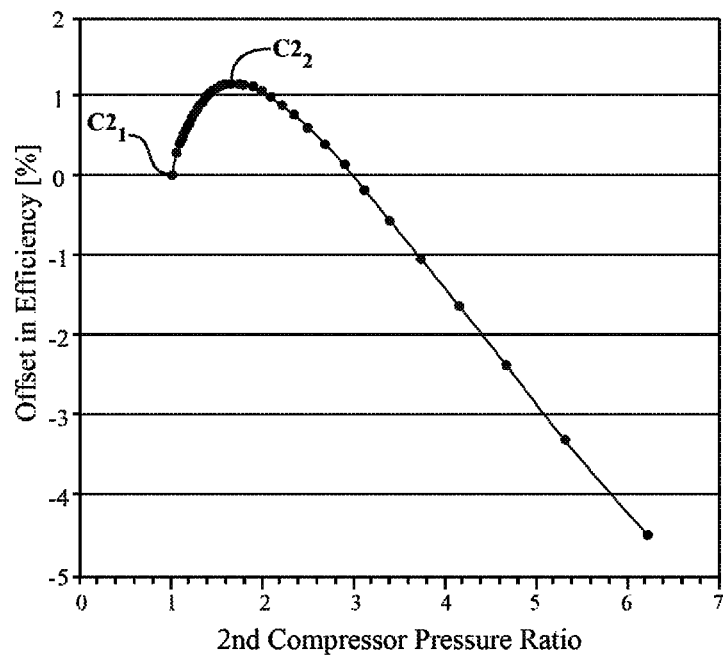
FIG. 3 is graph illustrating a change in efficiency with a change in the pressure ratio of a second compressor located downstream from a gas turbine engine in accordance with an aspect of the present invention.

The decrease in the pressure ratio of the compressor section 24 may be at least partially offset by an increase in pressure ratio in a portion of the turbine engine cycle provided in the second compressor 58. For example, as seen in FIG. 3, the second compressor 58 may be operated at a pressure ratio between a ratio above 1 (point $C2_1$), i.e., above a point of zero compression, up to about 1.7 (point $C2_2$) to provide an improvement in operational efficiency of the combined cycle power plant 10 of up to about 1.1%. By providing a reduced temperature gas to the second compressor 58, i.e., the reduced temperature exhaust gas flow 60, the amount of work required to achieve a desired pressure ratio may be reduced, with a corresponding improvement in efficiency of the combined cycle efficiency. It should be understood that a particular pressure ratio with corresponding efficiency may be selected for the compressor section 24 and the second compressor 58 with reference to a desired overall plant efficiency and with reference to a desired power output for the power plant 10.

An overall improvement in efficiency of the power plant 10 may be obtained by using the heat generated in the second compressor 58 to reheat the exhaust gas flow 31 to a temperature that is readily utilized for low-temperature/low-pressure steam generation, providing additional heat energy for the steam flow 52 to the power generation low-pressure steam turbine 54 of the steam turbine unit 20, with a corresponding additional power output.

Figure 4:
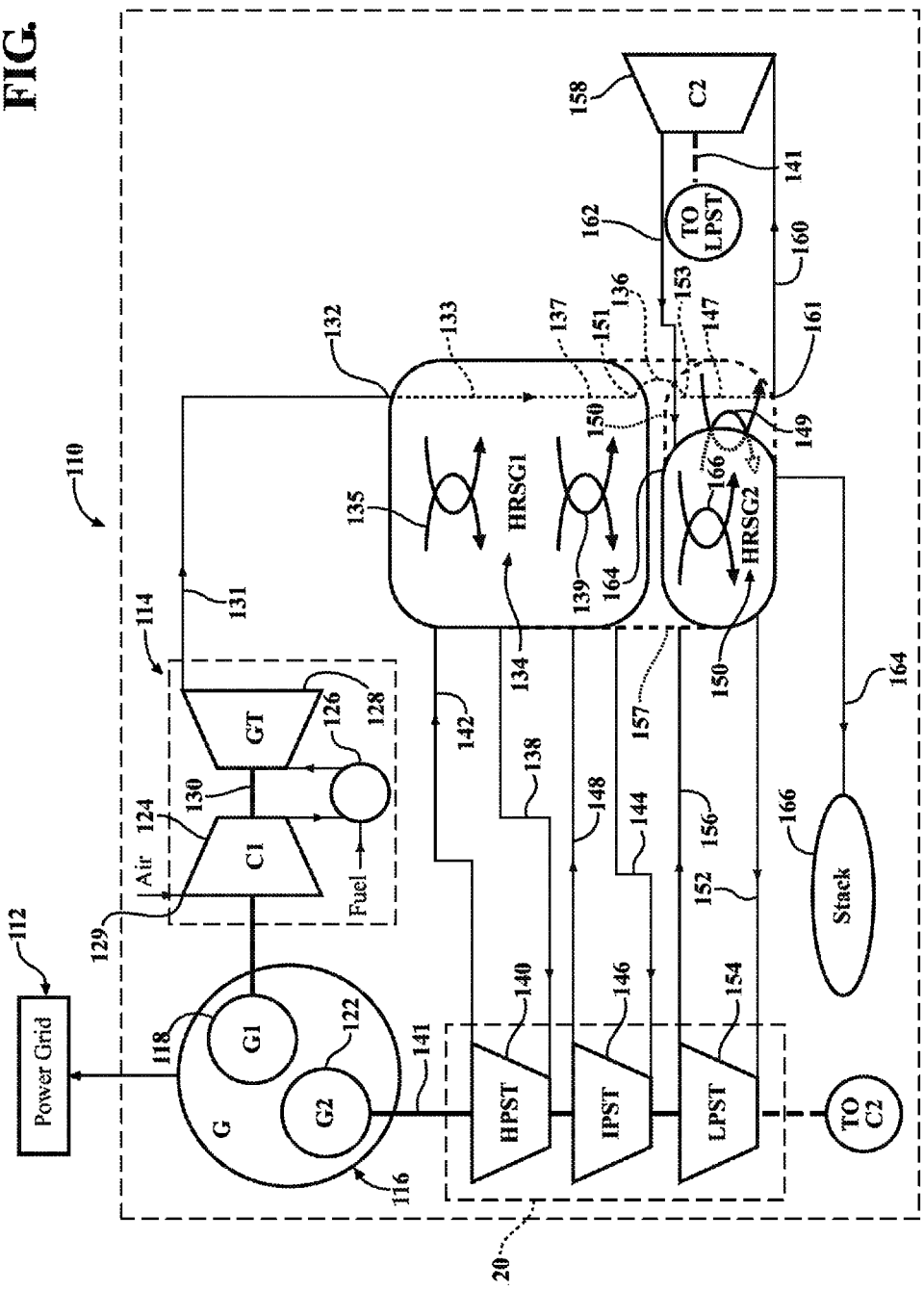
FIG. 4 is a diagrammatic illustration of a power plant incorporating components of an alternative embodiment of the present invention.

FIG. 4 illustrates an alternative embodiment of the invention in which elements corresponding to elements of FIG. 1 are identified with the same reference numeral increased by 100. The combined cycle power plant 110 of FIG. 4 comprises a gas turbine engine 114, steam power unit 120, generator unit 116 and HRSG unit 157 configured as described above with reference to FIG. 1. However, in the power plant 110 of FIG. 4, the second compressor 158 may be connected to the rotor shaft 141 of the steam turbine unit 120 to provide power to the second compressor 158. In particular, the second compressor 158 may receive power from the power generation low-pressure steam turbine 154 to compress a reduced temperature exhaust gas flow 160 and provide a reheated exhaust gas flow 162 to the second HRSG 150, in a manner as described above with reference to the embodiment of FIG. 1.

As a further alternative embodiment, the second compressor 58, 158 may be powered by an electric motor connected to the second compressor 58, 158 in a manner similar to the connection illustrated between the second compressor 58 and the auxiliary low-pressure steam turbine 68 of FIG. 1. The electric motor may be provided with power from the generator unit 16, and may provide power to the second compressor 58 at a selected speed independent of the speed of the steam turbine unit 16.

As a result of providing a reduced pressure ratio at the compressor section 24, with an associated reduction in energy input to the compressed air exiting the compressor section 24, the compressed air exiting the compressor section 24 and provided to the combustor 26 may be at a reduced temperature. In order to maintain a required firing temperature in the combustor 26, it may be necessary to increase the mass flow of fuel into the combustor 26 per unit mass flow of the air.

In addition, the reduced exit pressure that may be provided by the compressor section 24, with a corresponding reduced mass flow to the turbine section 28, may result in a reduced absolute power output for given size of the gas turbine engine 14. However, the reduced temperature and pressure loadings provided by the reduced pressure ratio in the compressor section 24 may allow cost reductions through the use of less advanced and/or less expensive materials for constructing certain components, such as the central casings and rotor disks, of the turbine section 28. Alternatively, the reduced pressure and temperature loads may permit reconfiguring the design of the turbine section 28 to increase the expansion ratio in the turbine section 28, allowing an increase in the difference between firing and exhaust temperatures without requiring an increase in the strength of the central casings and rotor disks of the turbine section 28 for carrying the pressure and thermal loads, while also maintaining higher exhaust temperatures for providing sufficient heat energy to the HRSG unit 37.

It should be understood that alternative designs of the HRSG unit 37 may be provided to facilitate operation of the power plant 10. For example, the HRSG unit 37 may be provided with a bypass to ambient air, where the gas turbine engine 14 may be initially operated during a startup operation without providing steam to the steam turbine unit 20. Subsequently, the steam turbine unit 20 may be brought on line to produce power, after which the second compressor 58 may be brought into operation to operate the power plant 10 at full power.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of increasing an efficiency of operation of a combined cycle power plant, the method comprising:
    providing a gas turbine engine providing a first power output and producing a turbine exhaust gas flow;
    removing heat from the turbine exhaust gas flow in a first heat recovery steam generator (HRSG) to form a reduced temperature exhaust gas and to produce a high pressure steam flow;
    expanding the high pressure steam flow in a high pressure steam turbine to produce a second power output;
    compressing the reduced temperature exhaust gas to add energy and form a reheated exhaust gas;
    removing heat from the reheated exhaust gas in a second heat recovery steam generator (HRSG) to produce a low pressure steam flow, wherein the turbine exhaust gas flow passes through the second HRSG to remove heat subsequent to removing heat from the turbine exhaust gas flow in the first HRSG and prior to compression of the exhaust gas; and
    expanding the low pressure steam flow in a low pressure steam turbine to increase the second power output.

2. The method of claim 1, wherein the low pressure steam flow is produced by heat from both the reheated exhaust gas and the turbine exhaust gas flow passing from the first HRSG.

3. The method of claim 1, including supplying power to a compressor from the low pressure steam turbine to compress the reduced temperature exhaust gas and form the reheated exhaust gas.

4. The method of claim 1, further including:
    providing a second low pressure steam turbine;
    expanding low pressure steam from the second HRSG in the second low pressure steam turbine; and
        supplying power to a compressor from the second low pressure steam turbine to compress the reduced temperature exhaust gas and form the reheated exhaust gas.

5. The method of claim 1, wherein the first power output comprises a power output to a first generator and the second power output comprises a power output to a second generator.

6. A method of increasing an efficiency of operation of a combined cycle power plant, the method comprising:
    providing a gas turbine engine providing a first power output and producing a turbine exhaust gas flow;
    removing heat from the turbine exhaust gas flow in a first heat recovery steam generator (HRSG) to form a reduced temperature exhaust gas and to produce a high pressure steam flow;
    expanding the high pressure steam flow in a high pressure steam turbine to produce a second power output;
    compressing the reduced temperature exhaust gas in a compressor to add energy and form a reheated exhaust gas, the compressor operating at a speed unrelated to a speed of the gas turbine engine;
    conveying the reheated exhaust gas directly from an outlet of the compressor to an inlet of a second heat recovery steam generator (HRSG);
    removing heat from the reheated exhaust gas in the second heat recovery steam generator (HRSG) to produce a low pressure steam flow; and
    expanding the low pressure steam flow in a low pressure steam turbine to increase the second power output.

7. A combined cycle power plant comprising:
    a gas turbine engine including a first compressor providing compressed air for combustion to form a hot working gas, and a turbine section for expanding the hot working gas and producing a turbine exhaust gas flow;
    a first heat recovery steam generator (HRSG) receiving the turbine exhaust gas flow and removing heat from the turbine exhaust gas flow to form a reduced temperature exhaust gas and to produce a high pressure steam flow;
    a high pressure steam turbine receiving and expanding the high pressure steam flow;
    a second compressor receiving and compressing the reduced temperature exhaust gas to add energy and form a reheated exhaust gas;
    a second heat recovery steam generator (HRSG) receiving and removing heat from the reheated exhaust gas to produce a low pressure steam flow, an exhaust gas flow outlet of the first HRSG connected to an exhaust gas flow inlet of the second HRSG, and an exhaust gas flow outlet of the second HRSG connected to the second compressor and providing the reduced temperature exhaust gas to the second compressor; and a low pressure steam turbine receiving and expanding the low pressure steam flow.

8. The combined cycle power plant of claim 7, including a connection providing power from the low pressure turbine to the second compressor.

9. The combined cycle power plant of claim 8, including a connection combining an output power from the lower pressure steam turbine with an output power of the high pressure steam turbine.

10. The combined cycle power plant of claim 9, including a generator driven by the combined output power of the high pressure steam turbine and the low pressure steam turbine.

11. The combined cycle power plant of claim 8, wherein the low pressure steam turbine comprises an auxiliary low pressure steam turbine, and including a power generation low pressure steam turbine connected to the high pressure steam turbine.

12. The combined cycle power plant of claim 11, including a generator driven by the combined output power of the high pressure steam turbine and the power generation low pressure steam turbine.

13. The combined cycle power plant of claim 7, wherein the first HRSG and second HRSG comprise different sections of a combined HRSG unit.

14. The combined cycle power plant of claim 7, including a connection combining an output power from the low pressure steam turbine with an output power of the high pressure steam turbine.

15. The combined cycle power plant of claim 14, including an intermediate pressure steam turbine and a connection combining an output power from the intermediate pressure steam turbine with the output power of the high pressure steam turbine.

16. The combined cycle power plant of claim 7, including a first generator powered by the gas turbine engine and a second generator powered by the high pressure steam turbine.

17. The combined cycle power plant of claim 16, wherein the first and second generators comprise different sections of a combined generator unit.

* * * * *